US012084326B2

(12) United States Patent
Christensen

(10) Patent No.: US 12,084,326 B2
(45) Date of Patent: Sep. 10, 2024

(54) LIFT AND TILT MECHANISM AND A TILT SYSTEM

(71) Applicant: Global FabTech (Shanghai) Company Limited, Shanghai (CN)

(72) Inventor: Hans Balle Christensen, Herning (DK)

(73) Assignee: Global FabTech (Shanghai) Company Limited, Shanghai (CN)

( * ) Notice: Subject to any disclaimer, the term of this patent is extended or adjusted under 35 U.S.C. 154(b) by 444 days.

(21) Appl. No.: 17/310,370

(22) PCT Filed: Jan. 31, 2020

(86) PCT No.: PCT/DK2020/050029
§ 371 (c)(1),
(2) Date: Jul. 29, 2021

(87) PCT Pub. No.: WO2020/160737
PCT Pub. Date: Aug. 13, 2020

(65) Prior Publication Data

US 2022/0119235 A1 Apr. 21, 2022

(30) Foreign Application Priority Data

Feb. 4, 2019 (DK) ............................ PA201970079

(51) Int. Cl.
*B66F 7/06* (2006.01)
*B66F 7/08* (2006.01)
*B66F 7/22* (2006.01)

(52) U.S. Cl.
CPC .............. *B66F 7/0691* (2013.01); *B66F 7/08* (2013.01); *B66F 7/22* (2013.01)

(58) Field of Classification Search
CPC .. B66F 7/0691; B66F 7/08; B66F 7/22; B66F 7/06

(Continued)

(56) References Cited

U.S. PATENT DOCUMENTS 5,215,351 A 6/1993 Lapointe
5,601,014 A 2/1997 Stevens et al.
2016/0207223 A1 7/2016 Schlough et al.

FOREIGN PATENT DOCUMENTS

IT TV20 120 068 A1 10/2013
WO 99/62813 A1 12/1999

OTHER PUBLICATIONS

International Search Report for International Patent Application No. PCT/DK2020/050029, dated May 18, 2020 in 4 pages.

(Continued)

*Primary Examiner* — Lynn E Schwenning
(74) *Attorney, Agent, or Firm* — Knobbe, Martens, Olson & Bear, LLP

(57) ABSTRACT

A lift and tilt mechanism (1) is disclosed, comprising a base frame (10) and an upper lever arm (2) rotatably connected to each other by a lower lever arm (3) and a control rod (4), wherein a rotating arm (6) is rotatably connected to an upper lever arm (2), a torque arm (9) is rotatably connected to a lower lever arm (3), and the rotating arm (6) and the torque arm (9) are rotatably connected to each other, and wherein a power source (8) is rotatably connected to the upper lever arm (2) and directly or indirectly to the connection joint (19) for the rotating arm (6) and the torque arm (9), in such a way that an extension of the length of the power source (8) causes its suspension point (11) on the upper lever arm (2) to move in an substantially vertically direction, whereby the upper lever arm (2) is tilted towards a more upright position. Furthermore, a tilt system (21) comprising such a mechanism (1) is disclosed.

4 Claims, 6 Drawing Sheets

Figure 1A:
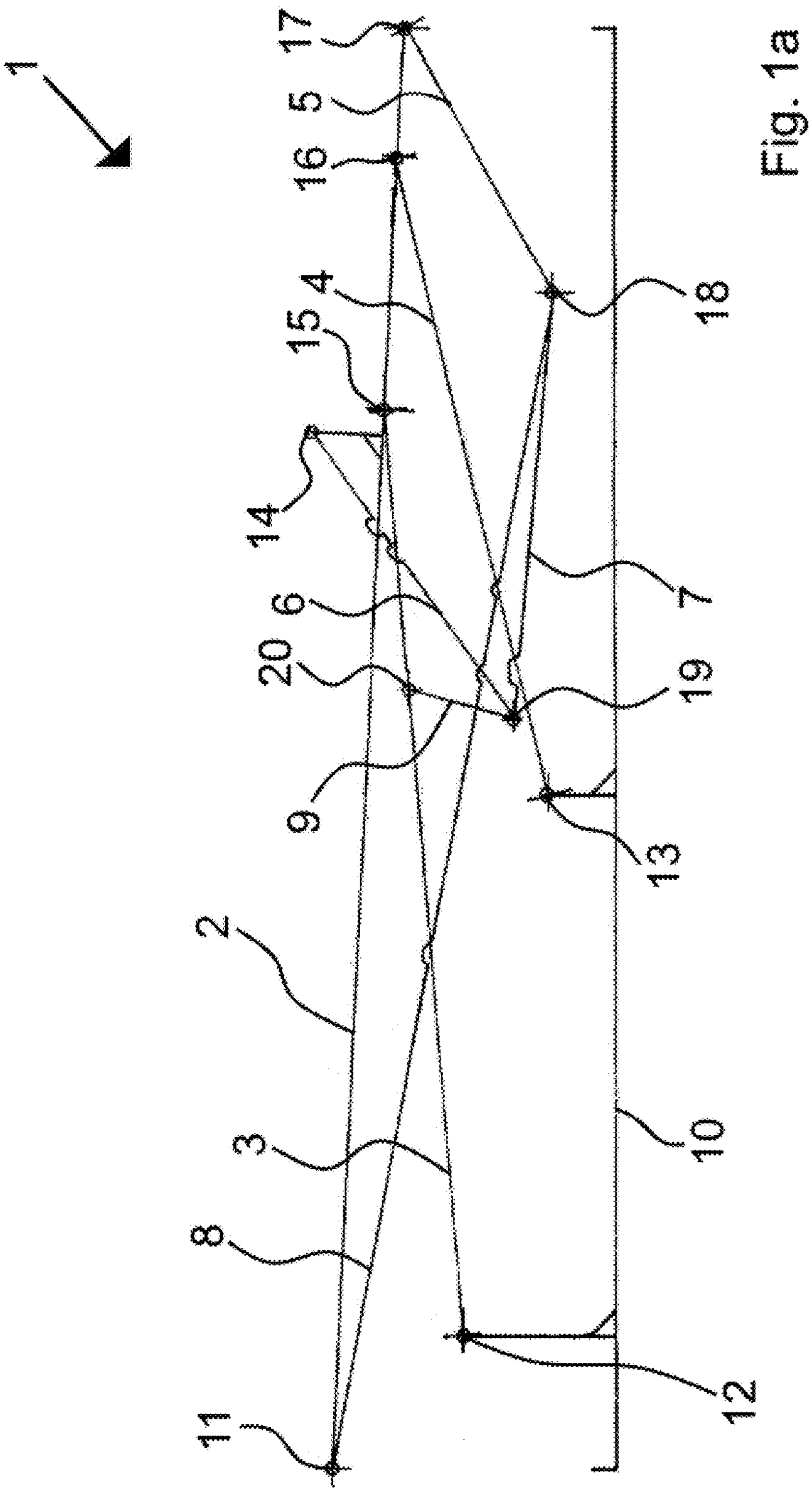

(58) Field of Classification Search
USPC .................................................. 414/754–782
See application file for complete search history.

(56) References Cited

OTHER PUBLICATIONS

Written Opinion of the International Searching Authority for International Patent Application No. PCT/DK2020/050029 in 5 pages.

LIFT AND TILT MECHANISM AND A TILT SYSTEM

CROSS-REFERENCE TO RELATED APPLICATIONS

This application is the U.S. National Phase under 35. U.S.C. § 371 of International Application PCT/DK2020/050029, filed Jan. 31, 2020, which claims priority to Danish Patent Application No. PA201970079, filed Feb. 4, 2019. The disclosures of the above-described applications are hereby incorporated by reference in their entirety.

FIELD OF THE INVENTION

The present invention relates to a lift and tilt mechanism and to a tilt system comprising such a lift and tilt mechanism.

BACKGROUND OF THE INVENTION

The use of lift and tilt mechanisms is well-known in different contexts. Many of such lift and tilt mechanisms operate according to the so-called "scissor principle", in which two lever arms are pivotally connected in a configuration similar to the one of the two arms in a pair of scissors. Most often, there are two pairs of such "scissored" lever arms arranged in two opposite sides of the lift and tilt mechanism, respectively.

At their bottom ends, these lever arms are connected to a base frame in such a way that, when the two ends of a pair of lever arms connected to the base frame are moved towards each other, the two lever arms both tilt towards a more upright position. The movements of the lever arms can be affected by an actuator such as, for instance, a hydraulic or an electric linear actuator.

This scissor principle functions very well and provides many good solutions for many lift and tilt mechanisms. However, if a vertical lift of one end of a lever arm is desired, such lift and tilt mechanisms working according to the scissor principle are usually rather voluminous, which makes it difficult to fit in such lift and tilt mechanism in many applications. Furthermore, such lift and tilt mechanisms typically do not show a good correlation between the extension of the length of the actuator and the distance lifted.

RELATED PRIOR ART

U.S. Pat. No. 5,601,014 discloses a lift and tilt table comprising a two arm linkage between a load bearing deck and a base, wherein a single extensible cylinder acting between one of the arms and the deck causes the arms to rotate as the cylinder is extended to lift and tilt the table relative to the base.

BRIEF DESCRIPTION OF THE INVENTION

It is an object of the invention to provide a lift and tilt mechanism and a tilt system that overcomes at least partly the above-mentioned disadvantages of such mechanisms known in the art.

The present invention relates to a lift and tilt mechanism comprising a base frame and at least one upper lever arm, which are connected to each other by at least one lower lever arm and at least one control rod, wherein a lower lever arm is rotatably connected at its first end to the base frame in a suspension point and at its second end to an upper lever arm in a connection joint, wherein a control rod is rotatably connected at its first end to the base frame in a suspension point and at its second end to an upper lever arm in a suspension point, wherein a rotating arm is rotatably connected at its first end to an upper lever arm in a suspension point, a torque arm is rotatably connected at its first end to a lower lever arm in a suspension point, and the rotating arm and the torque arm are rotatably connected at their respective second ends to each other in a connection joint, and wherein a linear actuator is rotatably connected at its first end to the upper lever arm in a suspension point and at its second end directly or indirectly to the connection joint for the rotating arm and the torque arm, in such a way that an extension of the length of the linear actuator causes the suspension point to move in an substantially vertically direction, whereby the upper lever arm is tilted towards a more upright position.

Through a proper optimisation of the lengths of the arms and rods and of the positions of the suspension points and connection joints in a configuration like this, it is possible to obtain a lift and tilt mechanism, which is substantially more compact than known mechanisms based on the scissor principle, which provides a substantially vertical motion of the suspension point of the linear actuator on the upper lever arm and which, at the same time, optimises the correlation between length extension of the linear actuator and the vertical motion of the suspension point of the linear actuator on the upper lever arm.

In an embodiment of the invention, the second end of the linear actuator is rotatably connected directly to the connection joint for the rotating arm and the torque arm.

Connecting the linear actuator directly to the common connection joint for the rotating arm and the torque arm reduces the production costs of the lift and tilt mechanism.

In an embodiment of the invention, the second end of the linear actuator is rotatably connected to a first end of a connecting arm in a connection joint, the other end of which connecting arm is rotatably connected to the rotating arm and the torque arm in their common connection joint, and a drag-and-push rod is rotatably connected at its first end to the upper lever arm in a suspension point and at its other end to the linear actuator and the connection arm in their common connection joint.

Connecting the linear actuator to the common connection joint of a connecting arm and a drag-and-push rod as described above allows for the use of longer linear actuators, which would not fit into the very compact construction if they were to be connected directly to the common connection joint for the rotating arm and the torque arm. Furthermore, the use of a connecting arm and a drag-and-push rod like described enables for an even better adjustment of the correlation between length extension of the linear actuator and the vertical motion of the suspension point of the linear actuator on the upper lever arm.

In another aspect of the invention, it relates to a lift and tilt system comprising a tilt mechanism as described above.

A tilt system comprising a lift and tilt mechanism as described above can be made very compact and is, therefore suitable for being used in places, where the available space is relatively small compared to the required power of the tilt system.

In an embodiment of the invention, the tilt system is able to tilt the upper lever arm in an angle of at least 40°, preferably at least 60°, compared to the base frame.

THE DRAWINGS

Figure 1B:
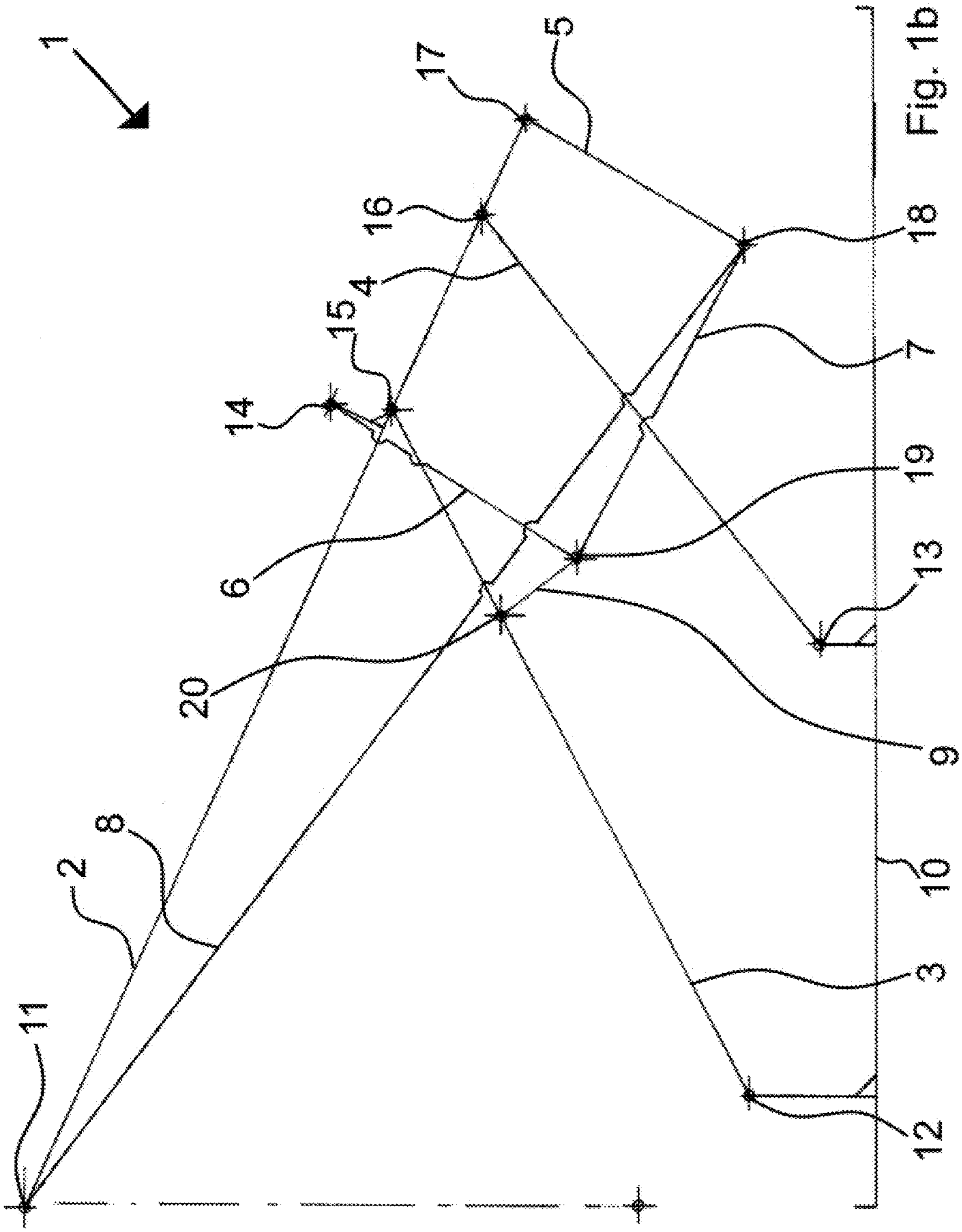
Figure 1C:
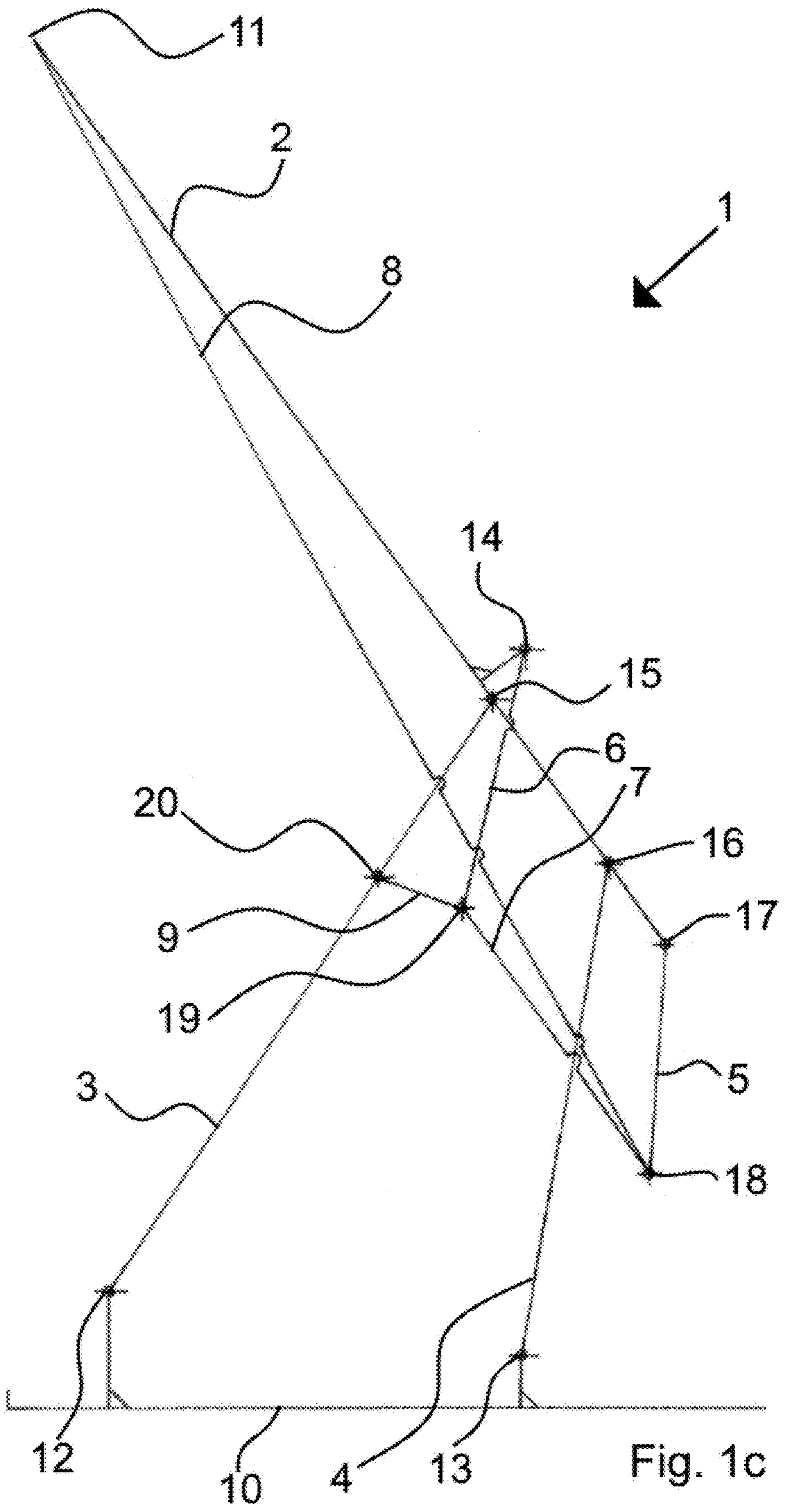
Figure 2:
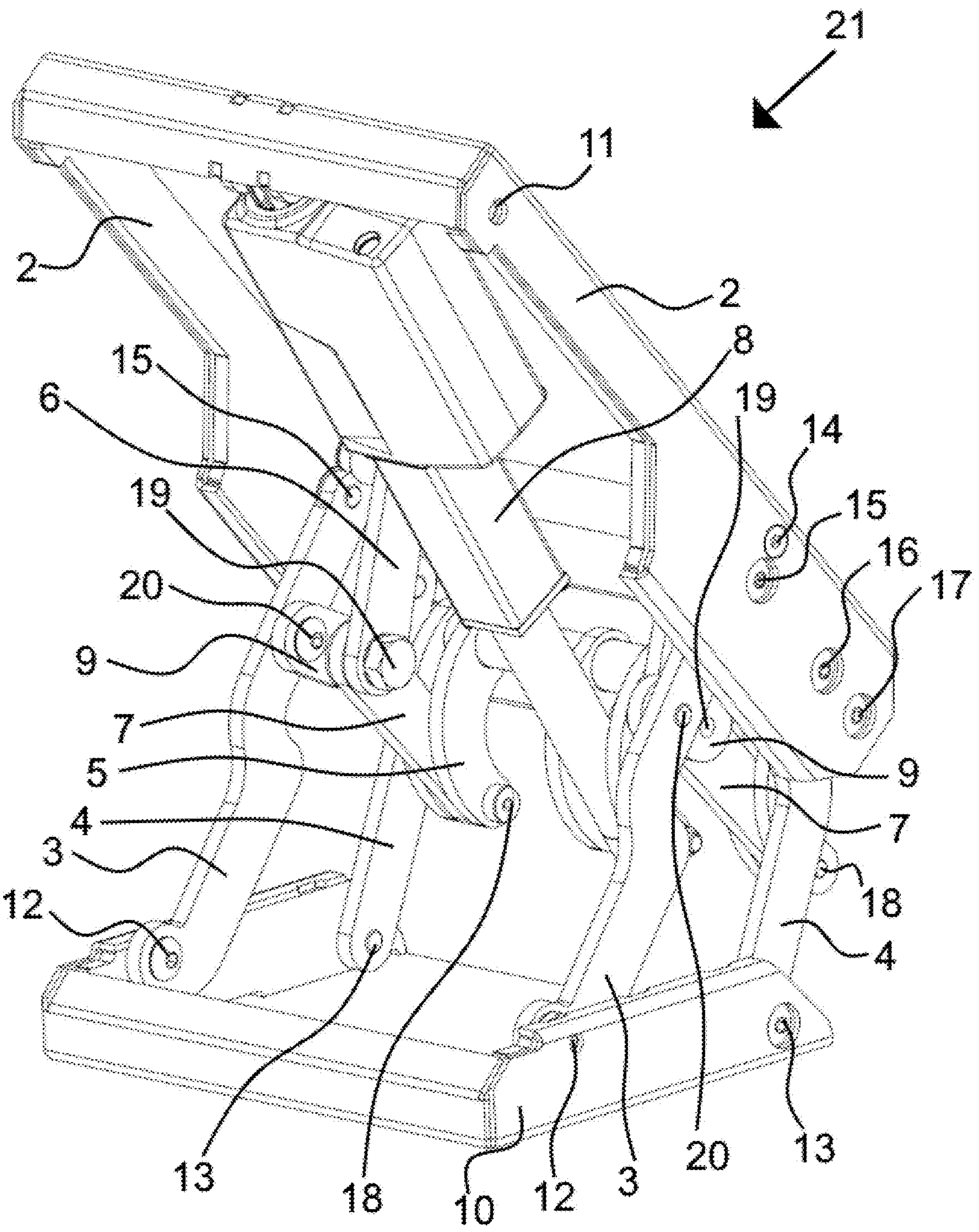
Figure 3A:
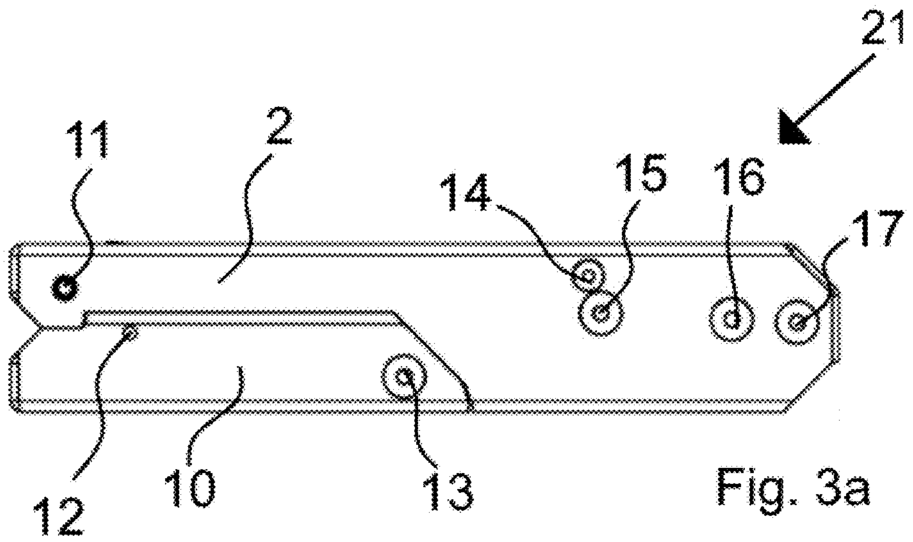
Figure 3B:
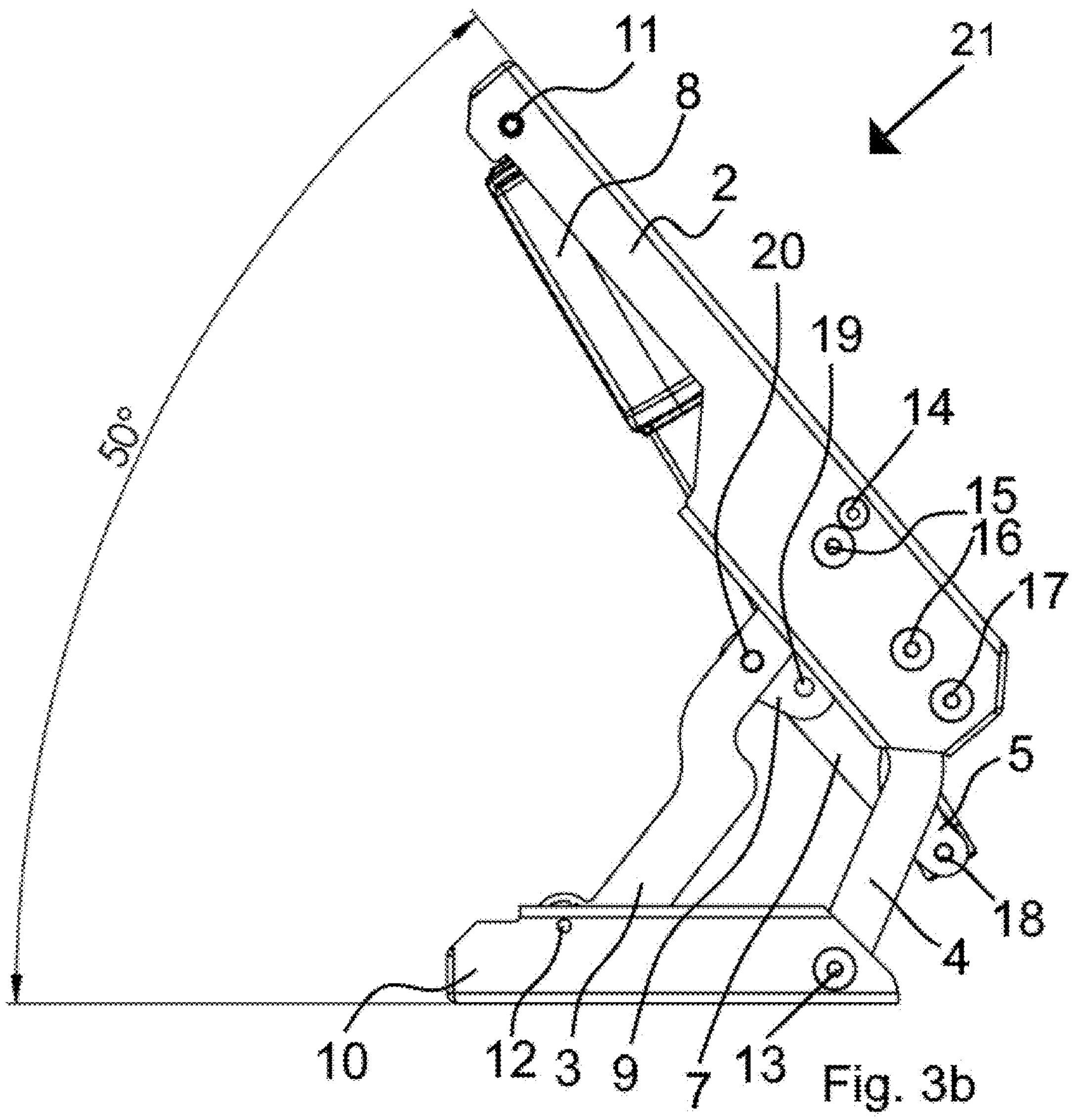
Figure 4:
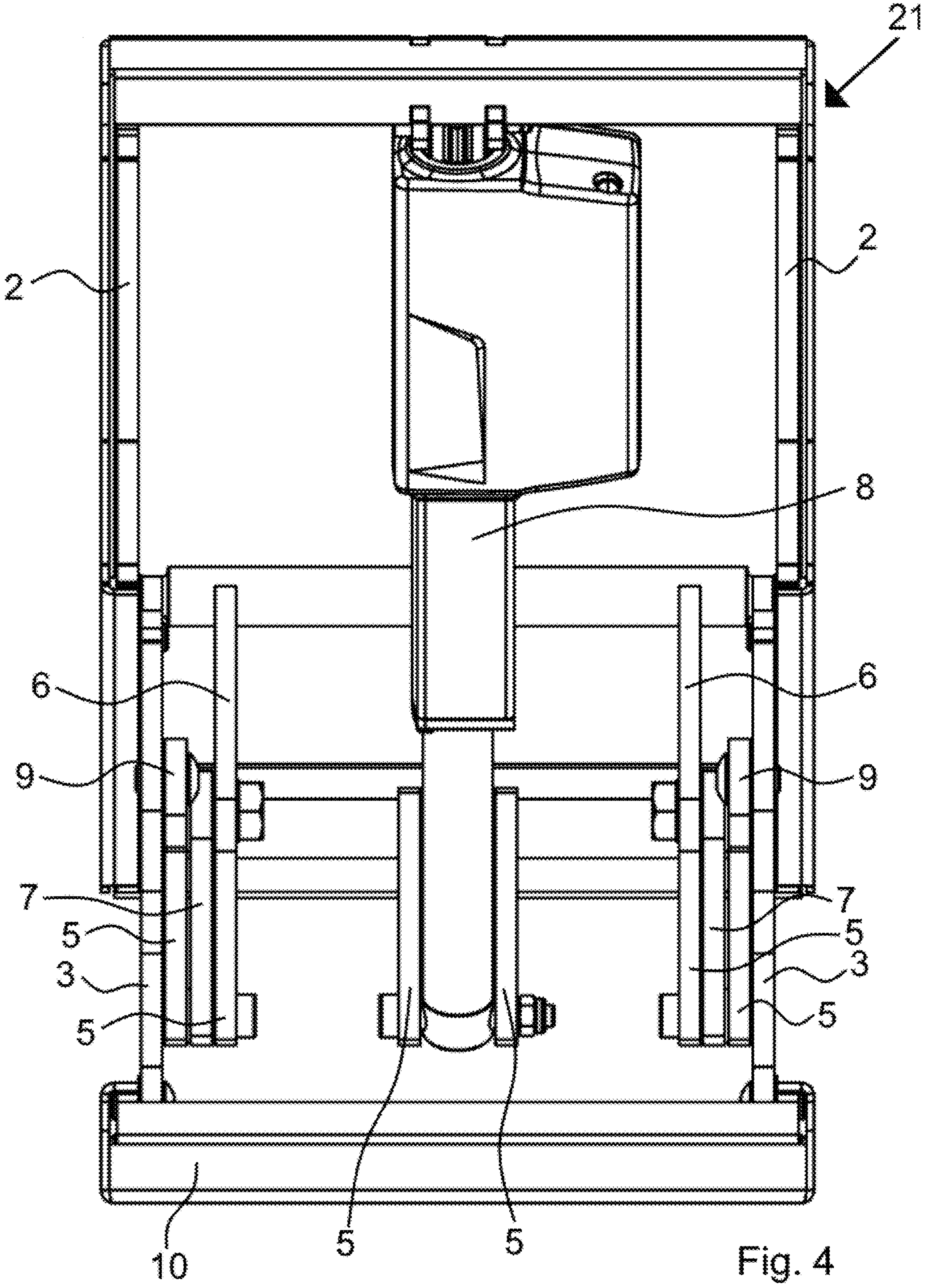

In the following, a few exemplary embodiments of the inventions are described in more detail with reference to the drawings, of which FIG. 1*a* is a principle sketch of a lift and tilt mechanism according to an embodiment of the invention in a fully collapsed configuration, FIG. 1*b* is a principle sketch of the same lift and tilt mechanism a partly unfolded configuration, FIG. 1*c* is a principle sketch of the same lift and tilt mechanism in a fully unfolded configuration, FIG. 2 is a perspective view of a tilt system according to an embodiment of the invention in a fully unfolded configuration, FIG. 3*a* is a side view of the same tilt system in a fully collapsed configuration, FIG. 3*b* is a side view of the same tilt system in a fully unfolded configuration, and FIG. 4 is a front view of the same tilt system in a fully unfolded configuration.

DETAILED DESCRIPTION OF THE INVENTION

FIGS. 1*a*-1*c* are principle sketches of a lift and tilt mechanism 1 according to an embodiment of the invention in a fully collapsed, in a partly unfolded and in a fully unfolded configuration, respectively.

A base frame 10 and an upper lever arm 2 are connected to each other by a lower lever arm 3 and a control rod 4. In practice, there is an upper lever arm 2, a lower lever arm 3 and a control rod 4 in both sides of the lift and tilt mechanism 1. For the sake of explanation, however, the following section explains the function of one such set of components 2-4 only.

As illustrated in FIGS. 1*a*-1*c*, the lower lever arm 3 is rotatably connected at its first end to the base frame 10 in a suspension point 12 and at its second end to the upper lever arm 2 in a connection joint 15, and the control rod 4 is rotatably connected at its first end to the base frame 10 in a suspension point 13 and at its second end to the upper lever arm 2 in a suspension point 16.

A rotating arm 6 is rotatably connected at its first end to the upper lever arm 2 in a suspension point 14, a torque arm 9 is rotatably connected at its first end to the lower lever arm 3 in a suspension point 20, and the rotating arm 6 and the torque arm 9 are rotatably connected at their respective second ends to each other in a connection joint 19.

Furthermore, a linear actuator 8 is rotatably connected at its first end to the upper lever arm 2 in a suspension point 11 and at its second end to a first end of a connecting arm 7 in a connection joint 18, the other end of which connecting arm 7 is rotatably connected to the rotating arm 6 and the torque arm 9 in their common connection joint 19.

Finally, a drag-and-push rod 5 is rotatably connected at its first end to the upper lever arm 2 in a suspension point 17 and at its other end to the linear actuator 8 and the connection arm 7 in their common connection joint 18.

As can be seen by comparing FIGS. 1*a*-1*c*, this configuration of the lift and tilt mechanism 1 means that an extension of the length of the linear actuator 8 causes the suspension point 11 to move in an substantially vertically direction, whereby the upper lever arm 2 is tilted towards a more upright position. The lift and tilt mechanism 1 can be constructed so that there is a very good correlation between the extension of the length of the linear actuator 8 and the vertical distance, through which the suspension point 11 of the linear actuator 8 on the upper lever arm 2 is moved.

In more detail, FIGS. 1*a*-1*c* show that, when the length of the linear actuator 8 is increased, the linear actuator 8 forces the connection joint 18 away from suspension point 11, and the drag-and-push rod 5 rotates around its suspension point 17 on the upper lever arm 2.

Likewise, the rotating arm 6, the second end of which is connected to the connection joint 18 through the connecting arm 7, rotates around its suspension point 16 on the upper lever arm 2.

As is the case for the rotating arm 6, the second end of the torque arm 9 is connected to the connection joint 18 through the connecting arm 7 and, consequently, the torque arm 9 rotates around its suspension point 20 on the lower lever arm 3. Thereby, the rotating arm 6 and, in turn, the suspension point 14 on the upper lever arm 2 is pressed in an upward direction.

The result of these motions is that the upper lever arm 2 is caused to tilt towards a more upright position, the motion of the upper lever arm 2 being controlled by circular motions of suspension points 15 and 16 around suspension points 12 and 13, respectively.

In a simpler embodiment of the invention, which is not shown in the figures, the second end of the linear actuator 8 is connected directly to the connection joint 19 and the drag-and-push rod 5 as well as the connecting arm 7 are omitted. Such an embodiment has lower production costs but the possibility of correlating the extension of the length of the linear actuator 8 and the vertical distance, through which the suspension point 11 of the linear actuator 8 on the upper lever arm 2 is moved, is somewhat reduced. Furthermore, many standard linear actuators are too long to fit into a very compact construction if they are to be connected directly to the connection joint 19.

FIG. 2 is a perspective view of a tilt system 21 comprising a lift and tilt mechanism 1 according to an embodiment of the invention in a fully unfolded configuration.

FIGS. 3*a* and 3*b* are side views of the same tilt system 21 in a fully collapsed configuration and a fully unfolded configuration, respectively.

FIG. 4 is a front view of the same tilt system 21 in a fully unfolded configuration.

LIST OF REFERENCE NUMBERS

1. Lift and tilt mechanism
2. Upper lever arm
3. Lower lever arm
4. Control rod
5. Drag-and-push rod
6. Rotating arm
7. Connecting arm
8. Linear actuator
9. Torque arm
10. Base frame
11. Suspension point for linear actuator on upper lever arm
12. Suspension point for lower lever arm on base frame
13. Suspension point for control rod on base frame
14. Suspension point for rotating arm on upper lever arm
15. Connection joint for upper lever arm and lower lever arm
16. Suspension point for control rod on upper lever arm
17. Suspension point for drag-and-push rod on upper lever arm
18. Connection joint for drag-and-push rod, connecting arm and linear actuator
19. Connection joint for rotating arm, connecting arm and torque arm
20. Suspension point for torque arm on lower lever arm
21. Tilt system

What is claimed is:

1. A lift and tilt mechanism comprising a base frame and at least one upper lever arm, which are connected to each other by at least one lower lever arm and at least one control rod, wherein the at least one lower lever arm is rotatably connected at its first end to the base frame in a first connection joint and at its second end to the at least one upper lever arm in a second connection joint, wherein the at least one control rod is rotatably connected at its first end to the base frame in a third connection joint and at its second end to the at least one upper lever arm in a fourth connection joint, wherein a rotating arm is rotatably connected at its first end to the at least one upper lever arm in a fifth connection joint, a torque arm is rotatably connected at its first end to the at least one lower lever arm in a six connection joint, and the rotating arm and the torque arm are rotatably connected at their respective second ends to each other in a seventh connection joint, and wherein a linear actuator is rotatably connected at its first end to the at least one upper lever arm in an eighth connection joint and at its second end to the seventh connection joint through a connecting arm for the rotating arm and the torque arm, in such a way that an extension of the length of the linear actuator causes the eighth connection joint to move in a substantially vertical direction, whereby the at least one upper lever arm is tilted towards a more upright position.

2. The lift and tilt mechanism according to claim 1, wherein the second end of the linear actuator is rotatably connected to a first end of the connecting arm in a ninth connection joint, the other end of which connecting arm is rotatably connected to the rotating arm and the torque arm in the seventh connection joint, and wherein a drag-and-push rod is rotatably connected at its first end to the at least one upper lever arm in a tenth connection joint and at its other end to the linear actuator and the connection arm in the ninth connection joint.

3. A tilt system comprising the lift and tilt mechanism according to claim 1, wherein the tilt system is able to tilt the at least one upper lever arm in an angle of at least 40° with respect to the base frame.

4. The tilt system according to claim 3, wherein the tilt system is able to tilt the at least one upper lever arm in an angle of at least 60° with respect to the base frame.

* * * * *